US011822518B2

(12) United States Patent
Maddila et al.

(10) Patent No.: US 11,822,518 B2
(45) Date of Patent: Nov. 21, 2023

(54) CONCURRENT EDIT DETECTION

(71) Applicant: Microsoft Technology Licensing, LLC, Redmond, WA (US)

(72) Inventors: Chandra Sekhar Maddila, Redmond, WA (US); Nachiappan Nagappan, Bellevue, WA (US); Christian Alma Bird, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/988,580

(22) Filed: Nov. 16, 2022

(65) Prior Publication Data

US 2023/0076610 A1 Mar. 9, 2023

Related U.S. Application Data

(63) Continuation of application No. 16/985,919, filed on Aug. 5, 2020, now Pat. No. 11,550,758.

(51) Int. Cl.
*G06F 16/178* (2019.01)
*G06F 8/71* (2018.01)
*H04L 67/55* (2022.01)
*H04L 67/50* (2022.01)

(52) U.S. Cl.
CPC ............ *G06F 16/1787* (2019.01); *G06F 8/71* (2013.01); *H04L 67/535* (2022.05); *H04L 67/55* (2022.05)

(58) Field of Classification Search
None
See application file for complete search history.

(56) References Cited

U.S. PATENT DOCUMENTS

| 10,768,929 | B1* | 9/2020 | Turner | G06F 8/38 |
|---|---|---|---|---|
| 2011/0264705 | A1* | 10/2011 | Diamond | G11B 27/034 |
| | | | | 715/730 |
| 2019/0095197 | A1* | 3/2019 | Ross | G06F 8/71 |
| 2021/0182182 | A1* | 6/2021 | Felisatti | G06F 11/3688 |

* cited by examiner

*Primary Examiner* — James A Edwards
(74) *Attorney, Agent, or Firm* — Rainier Patents, P.S.

(57) ABSTRACT

A heuristics-based concurrent edit detector ("ConE") can notify collaborators about potential conflicts that may be caused by edits made by other collaborators. ConE may compare concurrent edits submitted by collaborators, calculate the extent of overlap between two sets of edits, apply one or more filters to balance recall versus precision, and decide whether to alert the collaborators about candidate potential conflicts. ConE may be light-weight and easily scalable to work in a very large environment with numerous collaborators.

20 Claims, 7 Drawing Sheets

FIG. 5

```
VideoPlayerMapper.cs  ↔ ×

Pull Request 4299101
public class ConvertedSerialLoop
{
    public async Task<string> Plugin_0(string input)
    {
        return TimeConsumingCalculation(input);
    } public async Task<string> workflow(Task<string> input)
    {
        Task<string> response0 = Plugin_0(await input);
        Task<string> response1 = Plugin_0(await response0);
        Task<string> response2 = Plugin_0(await response1);
        return response2;
    }
}

Pull Request 4299575
public class ConvertedSerialLoop
{
    public async Task<string> Plugin_22(string input)
    {
        return TimeConsumingCalculation(input);
    } public async Task<string> workflow(Task<string> input)
    {
        Task<string> response0 = Plugin_22(await input);
        Task<string> response1 = Plugin_22(await response0);
        Task<string> response2 = Plugin_22(await response1);
        return response2;
    }
}
```

CONCURRENT EDIT DETECTION

BACKGROUND

Using advances in computing and networking, people are able to tackle larger tasks through collaboration among many contributors. An effective and efficient way to manage collaborative efforts by a large group of people is desired.

BRIEF DESCRIPTION OF THE DRAWINGS

The accompanying drawings illustrate implementations of the present concepts. Features of the illustrated implementations can be more readily understood by reference to the following descriptions in conjunction with the accompanying drawings. Like reference numbers in the various drawings are used where feasible to indicate like elements. The accompanying drawings are not necessarily drawn to scale. In the figures, the left-most digit of a reference number identifies the figure in which the reference number first appears. The use of similar reference numbers in different instances in the description and the figures may indicate similar or identical items.

FIG. 5 illustrates an example integrated development environment, consistent with the present concepts.

DETAILED DESCRIPTION

Figure 1:
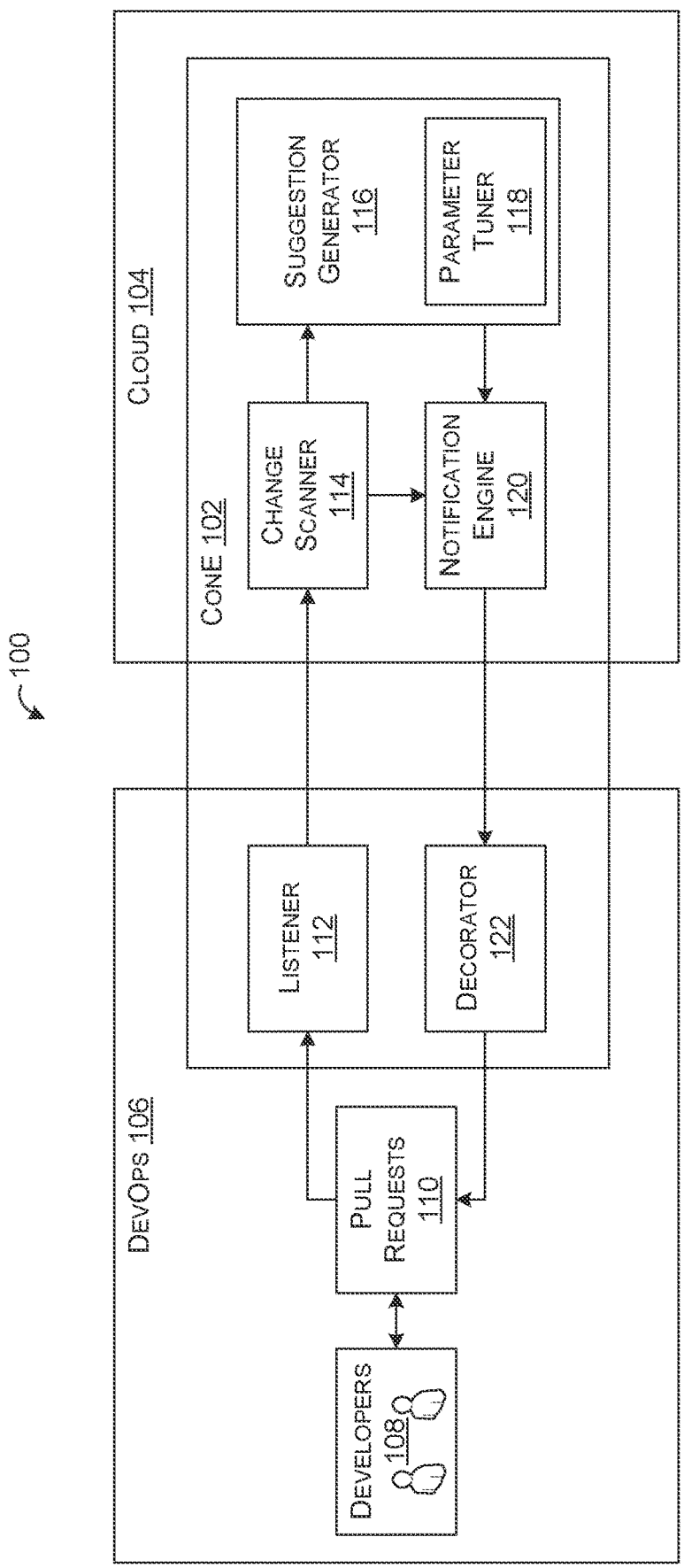
FIG. 1 illustrates an example concurrent edit detection environment, consistent with the present concepts.

There are many kinds of large-scale tasks that involve collaborative effort by many contributors. For example, large source code repositories for software often involve collaboration among many software developers to write, test, and update code for different parts of the software. As additional examples, a large-scale mapping project may involve teams of people who obtain mapping data from the real world, people who recreate their assigned parts of the maps, and people who review and update the maps; a large-scale genome project may have multiple teams assigned to sequence various parts of the gene sequences collaborating together; and a project to design a skyscraper building may involve teams of various designers to create architectural drawings of the skyscraper who are charged with creating structural floor plans, plans for electrical systems, plans for plumbing, plans for HVAC components, etc. For such collaborative large-scale projects, it is desirable to have a workable coordination system to reduce duplicative efforts, to reduce conflicting work, and to schedule the order of the edit tasks to be performed in a specific sequence.

The present concepts relate to a concurrent edit detection tool for large-scale projects involving many collaborators or contributors. The present concepts will be described primarily using source code editing scenario but can be applied to any other scenario where concurrent changes can occur during a collaborative project. That is, the present concepts can be applied to any type of content, whether it be source code, maps, architectural diagrams, or any other kind of editable content.

In a collaborative software development environment, a software developer may work on her individual work item independently and concurrently with other software developers. Each software developer can fork a copy of the code base from the latest master branch and edit the source code files locally (or on a server but separately from edits by other developers). The software developer can then create a pull request to merge her changes into the master. A pull request may be a request to submit a change or contribution to a shared project that is being developed by multiple collaborators. Software developers from different teams or organizations, co-located or geographically distributed, could make changes to the same source code files or areas through pull requests that are active at the same time period, which can occur often while developing complex software systems. With such a dynamically changing environment that can span several organizational boundaries and geographic boundaries, there may be insufficient awareness among the numerous software developers about the changes that are flowing into the master code base through other active pull requests from other software developers. This can lead to undesirable merge conflicts, logical bugs, duplication of work, and other problems that decrease developer productivity.

With the rise of globally distributed and large software development teams, the fact that developers working on the same code base might be in different teams, different companies, different geographies, or all of the above, can add a layer of complexity in managing conflicting edits. While collaborative software development may be essential for building large complex software systems that meet certain quality expectations and delivery deadlines, it can cause unintended consequences or side effects. The side effects can be as simple as syntactic merge conflicts, which could be handled by a version control system ("VCS"), to complex logical bugs, which may be undetectable by a VCS.

These problems rise primarily due to lack of communication and awareness among developers who are editing the same source code file or area at the same time through concurrent active pull requests. Unfortunately, developers encounter these problems very frequently (e.g., on a daily basis) and are forced to spend wasteful time (e.g., ranging from hours to even days) resolving conflicts and refactoring duplicate code. Sometimes, the conflict can be so convoluted that a developer has to abandon his or her changes and start over. Furthermore, conflicting changes can lead to broken builds, thus decreasing quality and causing reliability issues. Time spent in conflict resolution or refactoring activities takes valuable time away from developers and can hinder developers from fulfilling their primary responsibility, i.e., developing code. In addition to wasting the time and money, these problems can often frustrate developers, cause interpersonal angst among developers, and decrease collaborative productivity. Such problems could be avoided through effective communication and developing awareness about each other's changes that have a potential to cause conflicts.

There are several conventional solutions offered by source control systems that enable developers to subscribe to email notifications when new pull requests are created or existing pull requests are updated. In addition, existing products can show a feed of changes that are happening in a repository a user is interested in. However, such conventional solutions may work for small-scale projects, but for large repositories with many developers, the number of notifications become very large, the notification feed becomes noisy over time, and developers find it very difficult to digest all the notifications and locate particular pull requests that might cause conflicts. This problem can become even more aggravated when a developer works on multiple repositories and receives a voluminous amount of notifications.

Furthermore, many conventional solutions require developers to install multiple client tools and force them to switch their focus between different tools, applications, or windows. These conventional solutions do not fit naturally into developers' existing workflows and cause more inconvenience than the potential benefits they should yield.

Other existing solutions attempt to merge source code changes proactively between a developer's local branch and the latest version of master branch or between two developer branches, and notify the developers when a merge conflict situation is detected. Again, such solutions may work in a small environment with only a few developers but are impractical to implement in large development environments, because infrastructure costs outweigh the gains realized in terms of saved developer productivity. That is, these existing solutions are not scalable.

Some conventional tools can generate visualizations about team activities whenever a developer edits a class and notify developers through a client program in real time. However, such tools are not adaptive (i.e., does not automatically reflect any changes to the code unless the user decides to re-import the code base), not generic (i.e., works only on a specific programming language or a specific integrated development environment ("IDE"), and not scalable (i.e., operates on the client side and has to go through the cycle of import-analyze-present repeatedly for every change that is made inside the IDE).

Similarly, existing tools scans every single file that is opened or edited in every developer's workspace and communicate about their changes. This is not scalable and impractical to implement across large development teams.

Some existing tools explore the option of attempting actual merging and notifying the developers through a separate program on the client. These conventional solutions are very resource-intensive and not scalable, even with implementing optimization techniques like caching and tweaking the algorithm to compute relationships between changes when there is a change to history of the repository. Existing tools try to improve performance by leveraging caches for dependency analysis but are still very hard to scale to work on thousands of repositories with hundreds of thousands of pull requests due to the fact that they require client-server communications between IDEs and central source code management ("SCM") servers to scan, detect, attempt merge, and update every workspace with information about remote conflicting changes.

Some existing solutions explore speculative merging but they still lack scalability, non-obtrusiveness, and adaptability. For instance, some conventional techniques explore the idea of building binary classifiers to predict conflicting changes. Conventional solutions like this are generic, does not consume lot of resources on the client, and are non-intrusive. However, the amount of infrastructure needed to build such systems in large development environments, train and retrain the models, extract features for every pair of branches for every single update, and perform inference is going to be impractical. Also, some of the features that are used by the conventional models are not relevant in cases of pull requests that are short-lived or have only one or two files changed. Given that the model performance (precision and recall) are not very high and their feature space is very limited (e.g., only nine features), there is a good chance that the model's performance deteriorates when some of these features are not available. So, these solutions do not satisfy a desirable level of scalability and deployability for large-scale scenarios.

To address the problems associated with conventional techniques, the present concepts relate to a concurrent edit detector ("ConE") (pronounced "cone"). ConE can help collaborators be alerted about potential conflicts that could be caused by changes made by others. For example, ConE can help software developers discover changes made on other branches that might conflict with their own changes.

In some implementations of the present concepts, ConE may leverage light-weight heuristics. For example, rather than performing time-consuming and resource-intensive processes to detected actual verified conflicts, ConE may perform much faster and resource-saving processes of calculating a conflict potential. In one implementation, calculating a conflict potential may involve calculating an extent of overlap and checking for the existence of rarely concurrently edited files (RCEs). Furthermore, thresholding and ranking algorithms that filter and prioritize potentially conflicting changes for notification may be implemented. That is, ConE may calculate a percentage value representing an extent of overlap ("EOO") between two pull requests that are active at the same time frame. ConE can also check for the existence of rarely concurrently edited files ("RCEs"). Because heuristic techniques can result in false positives (as well as false negatives), thresholding techniques can be employed to filter out noise, and ranking techniques can be employed to prioritize changes with a higher potential for conflicts.

Accordingly, in some implementations, ConE may be built to be a highly scalable cloud service that can process tens of thousands of pull requests across different product lines and large-scale cloud development environments. ConE can provide an early conflict detection system that can be deployed in large scale, cloud based, enterprise settings comprised of numerous developers from multiple geographies. ConE can heuristically and proactively detect potential conflicts caused by concurrent edits to help mitigate problems caused by concurrent edits. For example, ConE can implement early intervention techniques, such as pull request notifications, which can facilitate improved communication among all developers participating in collaborative software development, helping avoid potential problems.

ConE, consistent with the present concepts, is an improvement over prior techniques, because ConE can effectively alert collaborators about potential conflicts while not being resource intensive and thus can be easily scaled to work on tens of thousands of repositories of large sizes. ConE can provide the benefits of alerting collaborator about potential conflicts without consuming a lot of computing resources.

Furthermore, ConE can be easily integrated and can fit naturally into existing software development workflows and tools with very little or no disruption. ConE is also very adaptable. ConE can be implemented in large organizations with disparate set of programming languages, tools, product portfolios, and thousands of developers that are geographically distributed. ConE may be universal and versatile in that it can support repositories that host codes written in any programming language and can even support new languages (including currently unknown future languages) with zero or minimal customization.

Furthermore, ConE, consistent with the present concepts, may be less intrusive than conventional techniques. That is, ConE can provide notification that fit naturally into existing developer workflows and environments. Moreover, ConE may be more easily deployed in operation with minimal cost.

FIG. 1 illustrates an example concurrent edit detection ("ConE") environment 100, consistent with the present concepts. The ConE environment 100 illustrated in FIG. 1 and described below is just one example environment in which the present concepts may be used. Many other types of environments can implement the present concepts and benefit from the use of ConE.

The ConE environment 100 may include a concurrent edit detector ("ConE") 102. The ConE 102 may be implemented by hardware, software, or a combination thereof. All or parts of the ConE 102 may be implemented on a single computer or multiple computers, within one network or distributed through many networks. Furthermore, the ConE 102, in whole or in part, may be implemented on a cloud 104 as a service, for example, to detect conflicting changes in a widely distributed repositories being edited by vast teams of collaborators that are spread out geographically and among many networks.

In this example scenario, the ConE 102 may be employed to detect conflicting edits in a development and operations ("DevOps") 106 ecosystem. The DevOps 106 may include a plurality of contributors working together who may potentially make conflicting changes. For example, the DevOps 106 may include developers 108. The developers 108 may be a part of different teams, groups, organizations, or companies, and may be located in different floors, buildings, cities, or countries, but may at times be working on the same content, a set of source code in this case. For instance, the developers 108 may "check out" sets of source code, for example, by making fork requests in a repository to create developer-specific copies (sometimes local copies) of a set of source code from the master. The developers 108 may make separate and individual changes by editing their local copies. Then, the developers 108 may submit pull requests 110 when the developers 108 wish to "check in" their modified source code (i.e., commit their edits to the master or submit their edits for review and approval).

In some implementations, the ConE 102 may include a listener 112 that can listen for events. In this example scenario, the listener 112 may listen for and detect the pull requests 110 created by the developers 108. For instance, in one implementation, the DevOps 106 may offer a service hook so that the listener 112 can listen to events fired in the DevOps 106 whenever the pull requests 110 are created, canceled, approved, rejected, etc. In one implementation, the listener 112 may constantly listen to events that happen in a pull request environment such as the DevOps 106.

The ConE 102 may include a change scanner 114. The listener 112 may queue events associated with the pull requests 110 in the change scanner 114. Therefore, the change scanner 114 may collect events associated with the pull requests 110 submitted by the developers 108 in the DevOps 106. For example, in a large development ecosystem, the developers 108 may create thousands of pull requests 110 in a day, and each pull request 110 may trigger several events detected by the listener 112. Those events may be collected and queued by the change scanner 114. The events queued in the change scanner 114 may include information about the pull requests 110, for example, an identification of the developer 108 who created or authored the pull request 110, an identification of the content (i.e., a list of source code files being changed by the pull request 110), a date and time stamp, a status of the pull request 110, etc. In one implementation, the ConE 102 may leverage a service of the DevOps 106 to queue events that are fired when new code updates or commits are pushed into the pull requests 110. Then, the change scanner 114 can process these events to learn more about the pull request 110, such as the list of files edited, the state of the pull request 110, etc.

The ConE 102 may include a suggestion generator 116. In one implementation, the change scanner 114 may send messages corresponding to the events in the queue to the suggestion generator 116 on a first come, first served ("FCFS") basis. In some implementations, the suggestion generator 116 may scan for potentially conflicting edits. The suggestion generator 116 may run a ConE algorithm to select candidate pull requests for notification to the developer 108 of a potential conflict. Accordingly, the ConE algorithm may run on a pull request 110 when a new activity is recorded (e.g., pushing a new update or commit) in the pull request 110.

The heuristics-based ConE algorithm, consistent with the present concepts, may balance recall versus precision. That is, higher recall means lower precision, and lower recall means higher precision. On the one hand, notifications about conflict may have high precision (i.e., have a low rate of false positives) but low recall (i.e., has the risk of missing actual conflicts. On the other hand, the notifications may have high recall (i.e., are likely to catch and alert about potential conflicts) but have low precision (merely warn about possible conflicts and thus include a higher rate of false positives).

Consistent with the present concepts, the contents being concurrently edited may be tokenized (or broken down into logical components), and the tokenization may have varying degrees of granularity. For instance, where the contents are source code, the contents may be tokenized into projects, files, classes, functions, lines, characters, etc. Where the contents are maps, the contents may be tokenized by hemispheres, quadrants, continents, countries, states, counties, cities, zip code regions, neighborhoods, streets, buildings, etc. Where the contents are architectural drawings, the contents may be tokenized by floors, sections, the type of system, offices, rooms, etc.

The more granular the tokenization, higher the precision and lower the recall. For example, if conflicting edits are checked at the character-level, precision will be high because conflicting edits to the same characters in source code is very likely to cause a conflict. However, recall will be low because such an analysis will fail to detect conflict edits, such as logical bugs, that arise from edits to different sets of characters in source code. Furthermore, more granular the tokenization, more time-consuming and resource-intensive the analysis will be.

On the flip side, higher level of granularity means high recall but lower precision. For example, if conflicting edits are checked at the file-level, recall may be high because any edits to the same file (even if those edits are on completely different lines of source code) may initiate a notification but precision may be low because the notification may be a false positive in that the two sets of edits to the same source code file did not actually result in any conflict. Nevertheless, such an analysis at a higher level of granularity (i.e., a heuristics-based) can be performed much faster with very little computer resources, and thus can be scaled to a very large environment. Although a heuristics-based algorithm that warns of potential conflicts (which may or may not involve actual conflicts) may cause the collaborator to perform additional analysis to determine whether there is or is not an actual conflict, such an early warning can still benefit the collaborator greatly as shown by an empirical study discussed below.

In the example scenario involving source code, the term "reference pull request" may refer to a pull request in which a new update or commit is pushed, which may trigger the ConE algorithm to be run on that reference pull request. The term "active pull request" may refer to a pull request whose state is active when the ConE algorithm is triggered to be run on a reference pull request. A recommendation (or a notification about changes) may be referred to as a "true positive" if it is interacted by and/or positively resolved by the developer 108 (i.e., the author) who made the reference pull request and to whom the recommendation was provided.

In some implementations of the present concepts, the ConE 102 may involve at least two constructs for detecting conflicting changes and determining candidates for notifications: (1) the extent of overlap ("EOO") between two concurrent edits, and (2) the existence of rarely concurrently edited files ("RCEs"). The ConE 102 may also involve parameters that may be tuned to change its behavior.

In some implementations, the suggestion generator 116 may analyze the extent of overlap (EOO) by scanning all the active pull requests (or a subset of the active pull requests that meets certain filtering criteria), and for each active pull request, calculating the percentage of files edited in the reference pull request that are overlapped with files edited in the active pull request. For example, the following formula may be used to calculate the EOO.

$$\text{Extent of Overlap} = \frac{|\{F_r \cap F_a\} - \{F_e\}|}{|\{F_e\}|} \times 100 \qquad \text{Formula 1}$$

In Formula 1, $F_r$ is the files edited in the reference pull request, $F_a$ is the files edited in an active pull request, and F e is the files excluded. The EOO formula looks at the number of files that are commonly edited in two pull requests as a measure of the overlap between the two pull requests to determine potential conflicting changes. In some implementations, certain file types whose probability of inducing conflicts is minimal may be excluded when calculating the EOO. This exclusion can help reduce false positive notifications.

Formula 1 may be used when the source code contents are tokenized at the file level. Other similar formulas may be used when the source code contents are tokenized at other levels of granularity, such as classes, lines, or characters.

Certain file types may be more likely to be involved in conflicting edits than certain other file types. In one empirical analysis that scanned through all the bug fix pull requests, certain files with .cs, .c, .cpp, and .ts types (i.e., files that contains source code) had a higher chance of introducing bugs through concurrent edits compared to other file types which hold, for example, configuration or initialization data. For instance, the percentages of file types seen in bug fixes during the empirical study were as follows: .cs (44.32%), .cpp (18.55%), .c (11.27%), .sql (6.2%), .java (5.36%), .ts (3.79%), .ini (0.2%), .csproj (0.04%), and others (10.27%). In one implementation, a white list of file types may be generated to include file types that are more likely to cause concurrent edit conflicts, for example, .cs, .cpp. c., .java, .ts, .sql, .py, and .js. White-listing can cut down on analysis and save computing resources.

Rarely concurrently edited files ("RCEs") may be files that typically are not edited concurrently in a conflicting manner. That is, updates or edits to RCEs tend to be made in a controlled fashion by a single person at a time or by a small enough set of people that their edits can be managed to avoid conflicting edits. Therefore, seeing RCEs in multiple active pull requests may be an anomalous phenomenon. If multiple RCEs are seen in multiple active pull requests, which should be unusual, then the changes to the RCEs may be reviewed and those involved in editing them may be notified. In one empirical study, the number of bug fix pull requests with and without RCEs were recorded, as shown in Table 1 below.

TABLE 1

| Edit Type | Count | Percentage |
|---|---|---|
| Bug Fix PRs without RCE | 1,617 | 78.3 |
| Bug Fix PRs with RCE | 446 | 21.7 |

In this empirical study, the total number of RCEs made up only 2% of the entire repository, and as shown in Table 1 above, 21.7% of bug fixes contained at least one RCE. Therefore, concurrent edits to RCEs are relatively unusual and developers 108 may be notified when this occurs.

One example implementation of the present concepts will be described to demonstrate and explain the ConE algorithm. Here, the ConE algorithm may be used to select candidate pull requests that developers 108 will be notified about. The ConE algorithm may leverage the techniques explained above—the extent of overlap (EOO) and the rarely concurrently edited files (RCEs)—to prune the search space and determine a subset of all the active pull requests may be notified about.

First, the ConE 102 may validate a reference pull request to decide whether to proceed with running the ConE algorithm. Any kind of validation may occur at this stage. For example, the ConE 102 may check whether the reference pull request is more than 30 days old. Pull requests 110 that are active for a long period of time may be stale and may never even be completed. That is, the pull requests 110 may have been practically abandoned but not officially closed. So, excluding old pull requests may save on computing resources as well as avoid wasting developers' time.

Second, for each reference pull request, a candidate set of files may be constructed by applying a white-listing technique on all the files that are edited in the reference pull request. Therefore, this step may construct a list of files that are edited in the reference pull request. Optionally, the list of files may include only the file types that are in the white list, explained above, and exclude file types that are not in the white list.

Third, all active pull requests (excluding the reference pull request) may be scanned to construct a candidate set of edited files for each of the active pull requests. This list of edited files for each of the active pull request may be constructed in a similar fashion as the list of edited files constructed for the reference pull request. Although the reference pull request may have an active status, the active pull requests referred to in these descriptions exclude the reference pull request for the obvious reason that there is no need to compare the reference pull request to itself. Optionally, additional filtering may be performed on the set of active pull requests. For example, all active pull requests submitted by the same developer as the reference pull request may be omitted based on the assumption that the developer (i.e., the reference developer) already knows about all active pull requests that she has submitted and only desires to be notified about potentially conflicting active pull requests submitted by other developers.

Fourth, an extent of overlap may be calculated for the reference pull request with respect to each of the active pull requests. For example, the extent of overlap may be calculated using Formula 1, described above. In one implementation, the calculated extent of overlap may be stored in tuples. For example, for every pair consisting of the reference pull request and an active pull request, a tuple may be stored. A tuple for the first active pull request may be Tea1=(PRr, PRa1, EOO1), where PRr is the reference pull request, PRa1 is an active pull request, and EOO1 is the extent of overlap calculated between the reference pull request and the active pull request. The EOO may be stored as a percentage value. A tuple may be stored for all the active pull requests with respect to the reference pull request. Accordingly, at the end of this process, a list of tuples may be generated for the reference pull request with respect to a plurality of active pull requests. For example, a list of tuples may be Tea={{PR1, PR7, 55}, {PR1, PR12, 95}, ..., {PR1, PR34, 35}}. The use of tuples is merely an example implementation of data organization; other implementations without the use of tuples are possible.

Fifth, the number of rarely concurrently edited files (RCEs) may be calculated for each pair consisting of the reference pull request and an active pull request. In one implementation, the existence of rarely concurrently edited files (RCEs) may be checked in each pair of the reference and active pull requests, and the number of RCEs may be stored in a tuple. For example, a tuple Tr={PRr, PRa1, R1} can be stored, where PRr is the reference pull request, PRa1 is an active pull request, and R1 is the number of RCEs in the overlap of the reference and active pull requests. The R in the tuple may be stored as an integer value indicating the number of RCEs that are edited by both the reference pull request and the active pull request. This process may be performed for all pairs of the reference pull request and active pull requests. At the end, a list of tuples may be generated for the reference pull request. For example, a tuple Tra={{PR1, PR7, 2}, {PR1, PR12, 2}, ..., {PR1, PR34, 9}} may be stored for the reference pull request.

Sixth, a set of candidate pull requests may be selected for notification by applying thresholds. In one implementation, one threshold may be applied to the EOO value and another threshold may be applied to the RCE value. For example, if the EOO threshold is greater than 50% and the RCE threshold is at least two, then the list of tuples containing EOO values and the list of tuples containing RCE values may be analyzed to determine which active pull requests satisfy both threshold criteria for notification. Alternatively, any active pull request that satisfies one of the two threshold criteria may be selected for notification.

Table 2 below shows an example set of pull requests and demonstrates how thresholding can be used to determine which active pull requests are candidates for triggering notifications.

TABLE 2

| Reference PR | Active PR | EOO | RCE | Selected |
|---|---|---|---|---|
| PR1 | PR7 | 55 | 2 | Yes |
| PR1 | PR12 | 95 | 2 | Yes |
| PR1 | PR34 | 35 | 9 | Yes |
| PR1 | PR47 | 10 | 1 | No |
| PR1 | PR51 | 45 | 0 | No |

In this example, if the candidate notification criteria are set to require the EEO value to be greater than or equal to 50 or the RCE value to be greater than or equal to two, then active pull requests PR7, PR12, and PR34 may be selected as candidates, whereas active pull requests PR47 and PR51 may not be selected. Other filtering criteria may be used to decide which active pull requests trigger notifications.

Seventh, the candidate pull requests that have been selected may be ranked, for example, in a descending order of conflict potential. In one implementation, a ranking algorithm that prioritizes the candidate pull requests may be applied. One example ranking algorithm may sort the candidate pull requests first based on the number of RCEs and then by the extent of overlap. This example ranking algorithm may prioritize the RCEs, because multiple RCEs being concurrently edited through multiple active pull requests may be an anomalous phenomenon that should be brought to the author's attention. For example, this ranking algorithm may rank the candidate pull requests shown in Table 2 to be ordered as follows: {PR34, PR12, PR7}.

In some implementations of the present concepts, the suggestion generator 116 may include a parameter tuner 118. The parameter tuner 118 may choose parameter values, which can be considered "knobs" for adjusting filters and thresholds. In one implementation, the parameter tuner 118 may have three knobs for adjusting (1) the extent of overlap (EOO) threshold, the rarely concurrently edited files (RCEs) threshold, and a threshold for the total number of files edited in the reference pull request. The parameter tuner 118 may be used to adjust the knobs more conservatively to decrease false positives and thus increase precision. The effect of such an adjustment may be decrease recall (i.e., lower coverage and have fewer notifications) but increase precision (i.e., the notifications have fewer false positives). Therefore, in an environment where collaborators prefer higher precision at the expense of lower recall, the parameter tuner 118 may be used to adjust the knobs accordingly. In another environment where the collaborators prefer the opposite, i.e., lower precision but higher recall, then the parameter tuner 118 can be used to adjust the knobs to suit collaborators' preferences.

One empirical analysis revealed a distribution of EOO among pull requests, as shown in Table 3 below

TABLE 3

| Extent of overlap (% range) | Number of PRs |
|---|---|
| 0-10 | 309 |
| 10-20 | 223 |
| 20-30 | 137 |
| 30-40 | 87 |
| 40-50 | 25 |
| 50-60 | 359 |
| 60-70 | 92 |
| 70-80 | 21 |
| 80-90 | 23 |
| 90-100 | 378 |

In Table 3, close to 50% of the pull requests had an EOO of 50% or less, and the median EEO value was 50. Based on this distribution, the parameter tuner 118 may be used to set the EOO thresholds to be >=50. Accordingly, this parameter may filter out active pull requests whose EEO with the reference pull request is less than 50% and will not be included in the set of candidate pull requests for notification. Other thresholds are possible. The parameter tuner 118 may be used to initialize and adjust the EEO threshold to balance recall versus precision.

Figure 2:
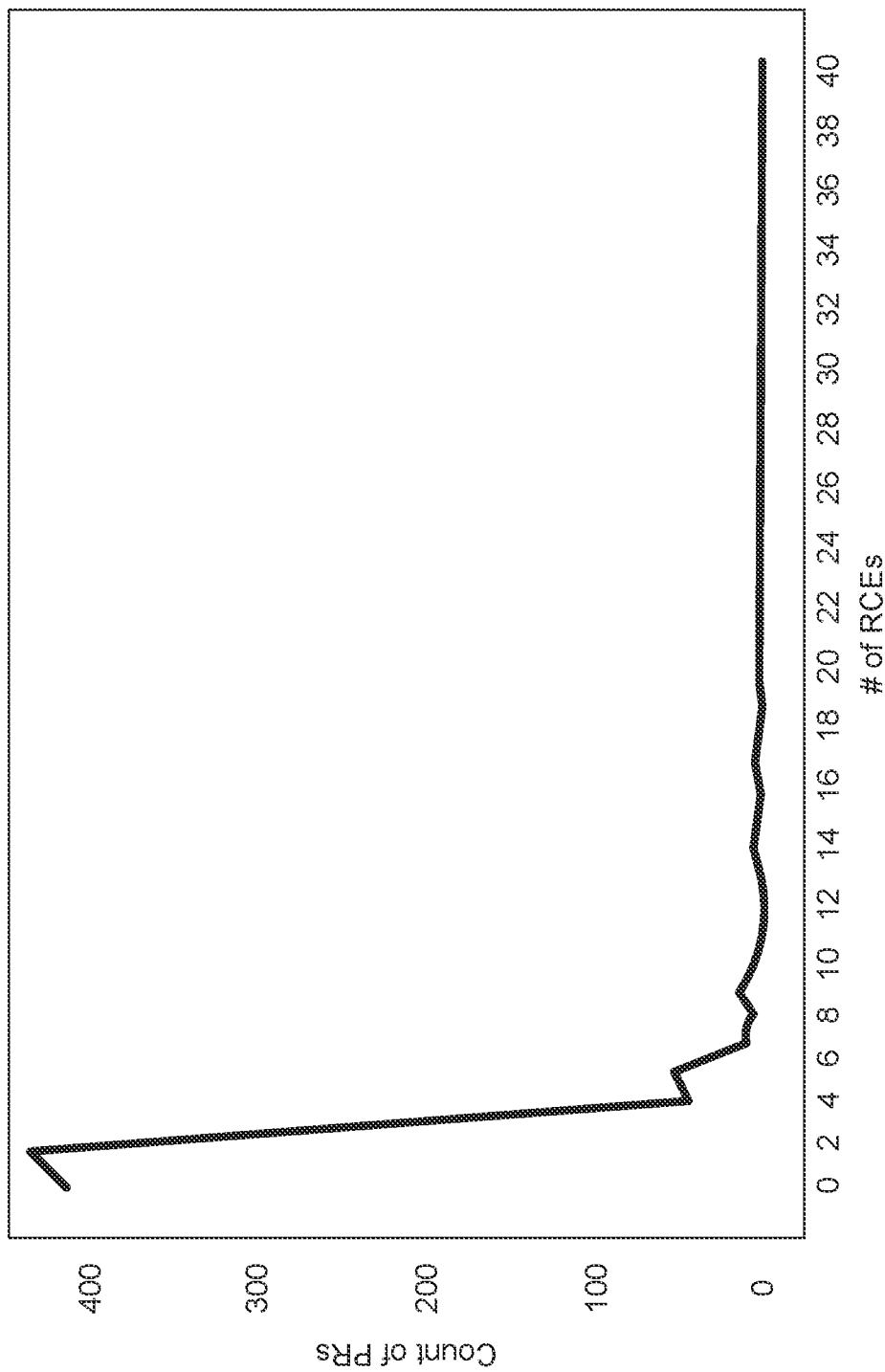
FIGS. 2 and 3 illustrate example graphs, consistent with the present concepts.

FIG. 2 illustrates an example graph from an empirical study, consistent with the present concepts. The empirical study analyzed how rarely concurrently edited files (RCEs) were distributed among the active pull requests, as shown in FIG. 2. The x-axis is the number of RCEs. The y-axis is the number of active pull requests. As shown in FIG. 2, in this empirical study, hundreds of pull requests included edits to zero or one RCE, around 50 or so pull requests had two or three RCEs, and then the curve flattens out because very few pull requests had more than six RCEs edited.

Based on this empirical distribution, the parameter tuner 118 may be used to set the RCE threshold to be >=2. Such a parameter setting would only include pull requests having at least two RCEs in the set of candidate pull requests for notification. Accordingly, the developers 108 can be notified about active pull requests that edit at least two common RCEs as the reference pull request.

If a developer creates a pull request by editing only two files and one of the two files is also edited in another active pull request, then the EOO would be 50, which would satisfy the EOO threshold requirement, and this active pull request would qualify to be selected as a candidate pull request for notification. However, notifying developers about one overlapping file out of two may lead to a significant number of notifications that include just one overlapping file, which may amount to significantly high number of false positives. This problem may be overcome by using the parameter tuner 118 to use the number of overlapping files as a knob or another filter. An empirical study analyzed the number of overlapping files in the active pull requests and is discussed in reference to FIG. 3.

Figure 3:
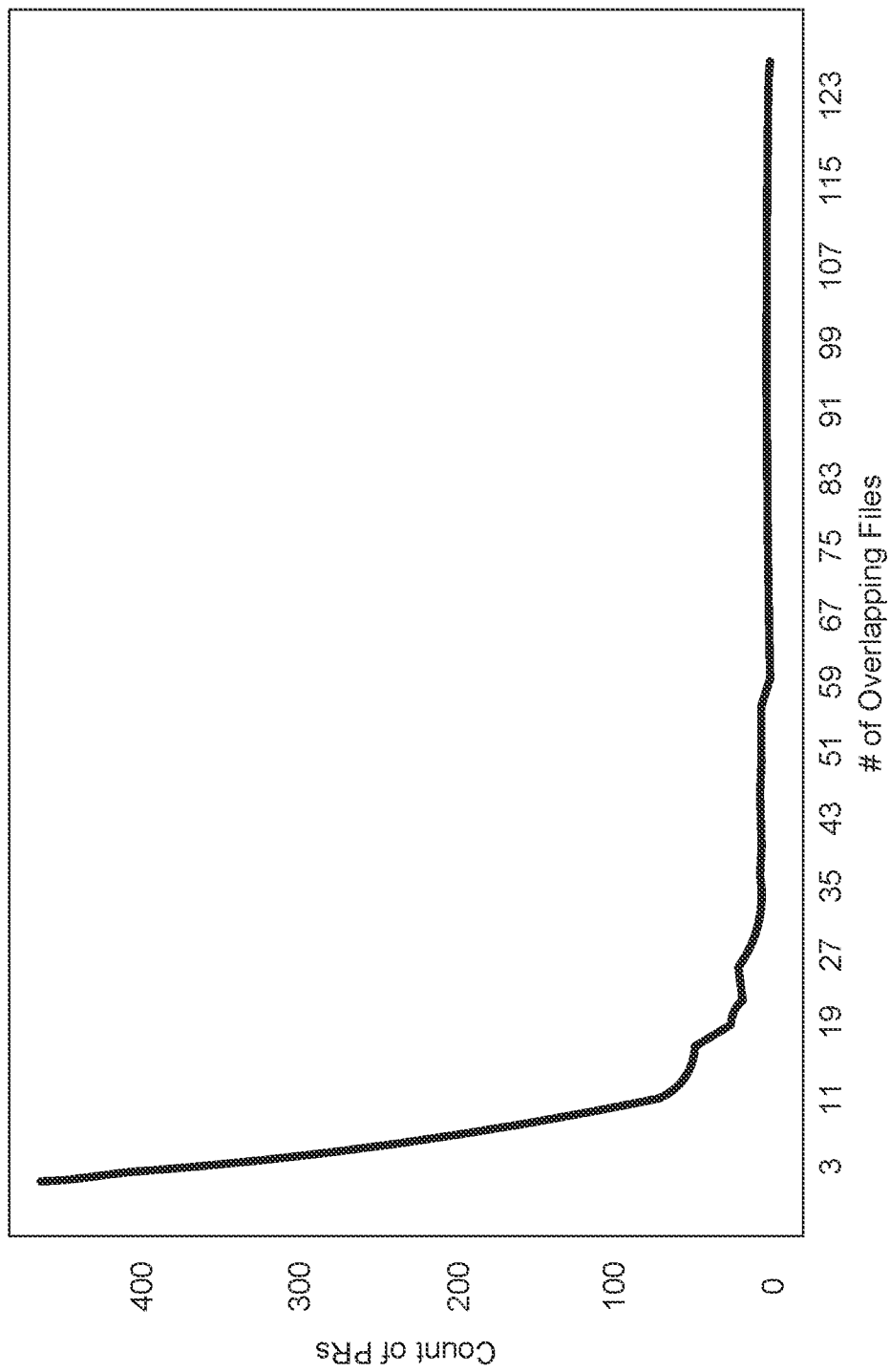

FIG. 3 illustrates an example graph from an empirical study, consistent with the present concepts. FIG. 3 shows a distribution of the number of overlapping files among pull requests. The x-axis is the number of overlapping files edited by a pair consisting of the reference pull request and an active pull request. The y-axis is the number of pull requests with the respectively number of overlapping files edited. As shown in FIG. 3, the number of pull requests with only a few overlapping files was high, the number of pull requests dropped sharply as the number of overlapping files increased, and the number of pull requests flattened out as the number of overlapping files increased. Based on this distribution, the parameter tuner 118 may be used to set a threshold of at least two overlapping files (in addition to the above-discussed thresholds for EOO and/or RCEs). Requiring at least two overlapping files can significantly cut down false positives.

These types of empirical analysis described above may be performed before the ConE 102 is activated so that the ConE 102 produces the desired balance of recall and precision from the start and results in satisfactory performance from the develops' perspective. For example, the ConE 102 may be initially deployed in shadow mode so that it listens for pull requests 110, run the ConE algorithm by comparing the pull requests 110, and determine candidate pull requests for notification, but not send any notifications. Running the ConE 102 in shadow mode may allow the collection of empirical data specific to the ConE environment 100 to help set initial parameters that are suitable for specific repository's needs and suitable for the particular preferences of the developers 108.

Consistent with the present concepts, the heuristic ConE algorithm may predict probable conflicts and thus may yield some number of false positives. The alternative would be to accurately detect actual conflicts with certainty by developing a full contextual and semantic understanding of source code changes and spending significant time and computing resources to analyze each source code edit. Therefore, the parameter tuner 118 may be used to strike an acceptable balance between satisfactory levels of recall or coverage (i.e., the number of pull requests that are flagged as potentially conflicting) versus satisfactory levels of precision (e.g., a false positive rate ("FPR")). If the precision level is too low (i.e., too many false positives), then the developers 108 would waste time analyzing notifications that do not involve actual conflicts, be dissatisfied with the ConE 102, and even begin ignoring valid notifications that involve actual conflicts. On the other hand, if the recall level is too low and the ConE 102 fails to notify the developers 108 about actual conflicts that they later discover through other means, then the developers 108 would lose confidence in the ConE 102 and similarly be dissatisfied with it. Accordingly, a data-driven approach explained above using empirical data may be adopted to set acceptable parameters that balance recall (coverage) and precision (FPR) from the start to effectively flag potential conflicts without overwhelming the developers 108 with too many false positive notifications.

Another balancing act may involve scaling and performance. The ConE 102 may actively listen to and examine source code updates that are pushed into the pull requests 110 that are produced. Therefore, performance may be important in order to scale the ConE 102 to serve, for example, tens of thousands of developers 108 who produce hundreds of thousands of pull requests 110 every week. Many strategies, methodologies, and design choices may be adopted to improve the performance of the ConE 102 and make it highly scalable to work in a very large environment. For examples, the filters discussed above (such as, excluding pull requests that are old, white-listing to analyze only specific file types, etc.) may be adopted to reduce the number of comparisons and computations involved, thus improving the performance of the ConE 102. Even a small improvement in performance can greatly enhance the ability of the ConE 102 to scale to a large degree.

Consistent with the present concepts, there is a trade-off that can be balanced between building a highly precise ConE that uses a lot of computing resources and time to accurately and exactly detect actual conflicting edits versus building a heuristics-based, light-weight, fast ConE that can be scaled to be useful in a very large software development environment that merely warns of potential conflicts which may include some false positives. The ConE 102, consistent with the present concepts, can use a heuristics-based algorithm, which checks for relatively simple but very effective heuristics and certain conditions or criteria to flag candidate conflicts that may be probable to cause unintended consequences. There may exist a possibility of notifying about changes that are benign (i.e., false positives), and conversely, missing notifications about breaking changes (false negatives). To reduce these undesirable outcomes, the parameter tuner 118 may be used to configure filters, thresholds, and/or criteria that help the notifications be very effective by striking a balance between the rate of false positives and the rate of false negatives (between recall and precision).

In some implementations, the ConE 102 may include a notification engine 120 that can generate notifications. For example, the suggestion generator 116 may send a message to the notification engine 120 about a potential conflict that the suggestion generator 116 decides should be alerted to the developer 108. The notification engine 120 may generate a notification about the potential conflict. The notification may include information, such as an identification of the pull request, the author of the pull request, the names of files concurrently changed by the pull request, and any other relevant metadata. The information included in the notification may be obtained by the notification engine 120 from the change scanner 114 and/or the suggestion generator 116.

The ConE 102 may include a decorator 122. The notification engine 120 can send a message to the decorator 122 about the notifications. The decorator 122 may generate a graphical user interface (or the information that would be included in a GUI) to present a notification to the developer 108. The decorator 122 may plug into a service on the DevOps 106 to present the notification in a seamless manner to minimize disruption to the developer 108. For example, the notification may be presented in the application that the developer 108 is using to develop source code so that the developer 108 does not have to switch between applications to see and address the notification. The ConE 102 may notify the author of the reference pull request about conflicting edits in one or more active pull requests in the form of a comment decoration in an ActiveX Data Objects (ADO) for the pull request in the DevOps 106. The ConE 102 may notify the author by sending an email about the potentially conflicting pull request. Many forms of communication are possible. Because the ConE algorithm is heuristic and thus notifies the developers 108 about potential or probable conflicts rather than actual specific conflicts, the developers 108 may to take further actions, such as review the edits made by the active pull request, analyze their potential impact, determine if there is an actual conflict, reach out to the author of the active pull request, develop a plan for resolving the conflict, and/or resolve the conflict.

Figure 4:
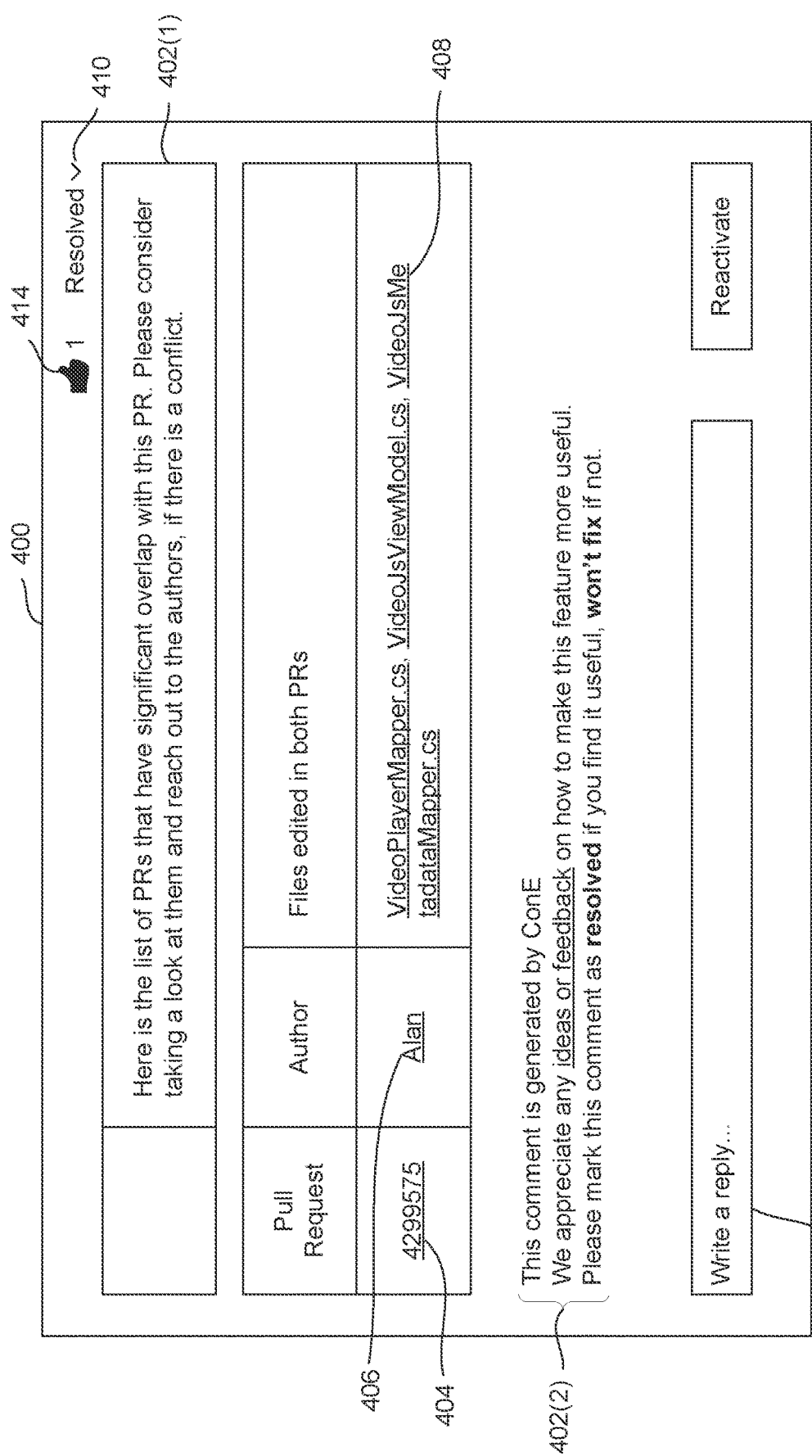
FIG. 4 illustrates an example notification, consistent with the present concepts.

FIG. 4 illustrates an example notification 400, consistent with the present concepts. In one implementation, the notification 400 may take the form of a comment on the reference pull request. The notification 400 may include any relevant information about a potential conflict from concurrent edits. For example, the notification 400 may include comment text 402(1) and 402(2) that provide a description of the comment, a pull request identification 404 that identifies the potentially conflicting active pull request, a collaborator identification 406 that identifies the developer author of the potentially conflicting active pull request, and/or a file identification 408 that identifies the files that are concurrently edited in both the reference pull request and the active pull request. The notification 400 may include user interfaces for the reference developer to provide input, such as feedback about the notification 400. For example, the notification 400 may include a resolution feedback 410 that the developer can set using a drop-down menu as either "resolved" or "won't fix," depending on how the developer chose to respond to the notification 400. The notification 400 may include a verbal feedback 412, which can allow the developer to provide an inline comment to reply to the notification verbally. The notification 400 may also include a thumb feedback 414 that the developer can set to be either thumbs up or thumbs down as either positive or negative feedback about the notification.

In some implementations, the notification 400 may include hyperlinks. For example, the pull request identification 404 may be a hyperlink that, which when clicked on, opens an information page about the pull request in an IDE. The collaborator identification 406 may be a hyperlink that opens up a chat messenger window to the author, creates an email message to the author, initiates a phone call to the author, opens an information page about the author, or facilitates the developer in contacting the author in any other way. The file identification 408 may be a hyperlink to view the concurrently edited file, for example, using a source code editor software.

FIG. 5 illustrates an example integrated development environment (IDE) 500, consistent with the present concepts. The IDE 500 may be opened in response to a developer clicking on a hyperlink presented as the file identification 408. In this example, the developer may click on the hyperlink for the file named VideoPlayerMapper.cs shown in FIG. 4 to open up the IDE 500 shown in FIG. 5. The IDE 500 may include an application window 502 that can include typical GUI interfaces, such as menus, buttons, toolbars, scroll buttons and bars, etc. The IDE 500 may display a filename 504 of the source code file being displayed. There are several ways that the IDE 500 can display the concurrently edited file. In some implementations, the IDE 500 may open a version of the file as edited by the reference pull request side-by-side with a version of the file as edited by the active pull request. The two versions of the file may be identified by their respective pull request identification numbers. The IDE 500 may highlight 506 (e.g., bolding, boxing, coloring, etc.) the specific edits made by the pull requests and/or may highlight the differences between the two versions. In other implementations, the IDE 500 may also display the master version (i.e., the unedited version) of the file side-by-side with either or both of the reference pull request version and/or the active pull request version.

In one implementation, the ConE 102 may track the developers' interaction with the notification 400. For example, feedback from the developers 108, in the form of thumbs up or thumbs down, resolved versus won't fix feedback, and/or verbal feedback, may be tracked. Such telemetry data may help understand how the developers 108 treat and respond to the notifications 400 from the ConE 102. The telemetry data may be stored in, for example, a SQL database. The feedback can be used to adjust or fine-tune the parameters using the parameter tuner 118. For example, if the developers 108 are receiving too many false positive notifications and providing substantial numbers of "won't fix" feedback, the parameter tuner 118 can adjust one or more filtering criteria to reduce false positives.

Figure 6:
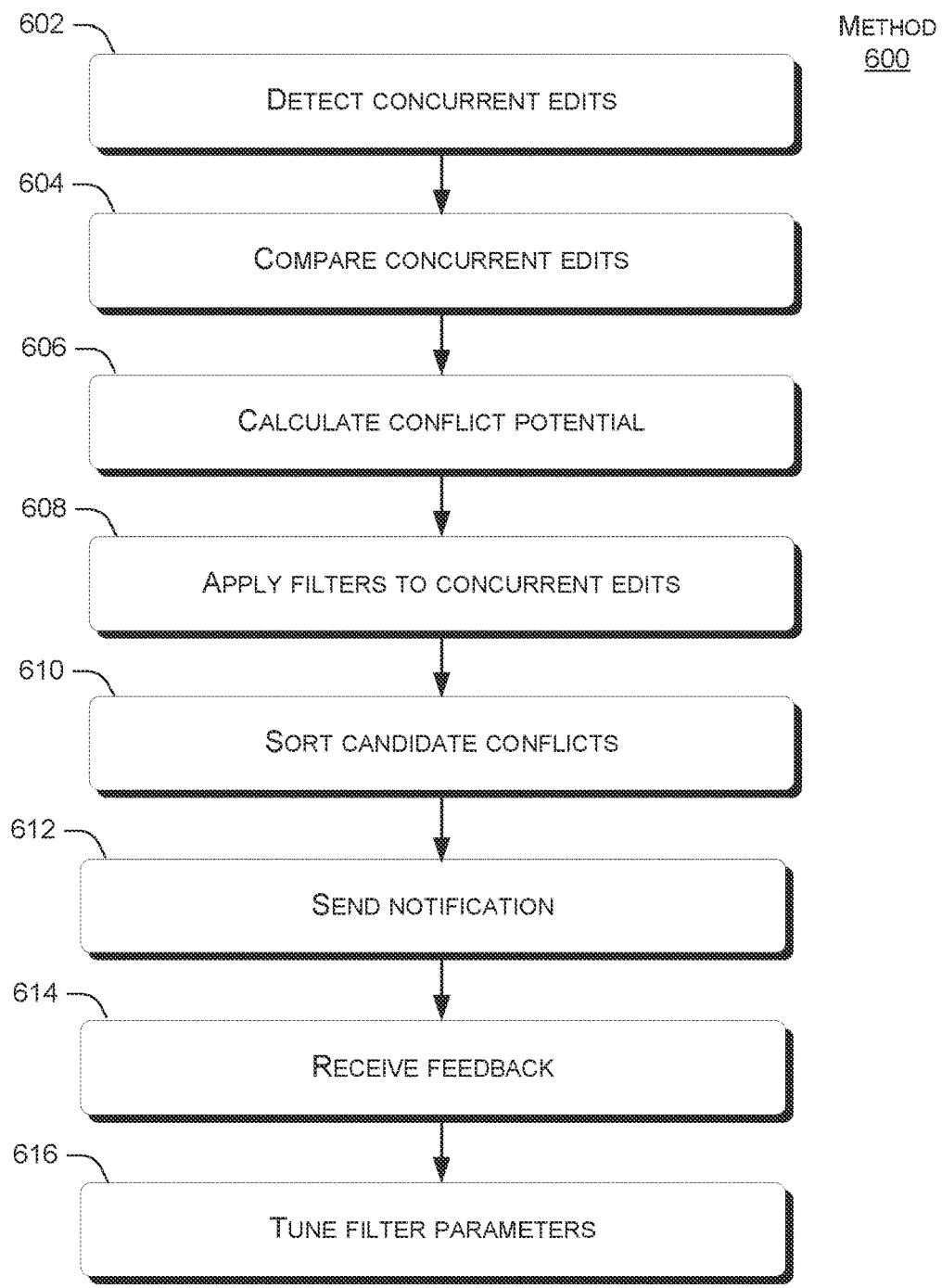
FIG. 6 shows a flowchart illustrating an example concurrent edit detection method, consistent with the present concepts.

FIG. 6 shows a flowchart illustrating an example concurrent edit detection ("ConE") method 600, consistent with the present concepts. This example ConE method 600 is presented for illustration purposes and is not meant to be exhaustive or limiting. The acts in the ConE method 600 may be performed in the order presented, in a different order, or in parallel or simultaneously, or may be omitted.

In act 602, concurrent edits may be detected. For example, act 602 may involve listening for pull requests submitted by software developers.

In act 604, concurrent edits may be compared to detect potential conflicts. For example, each pull request submitted by developers may be used a reference pull request to compare it against all other active pull requests submitted by other developers.

In act 606, a conflict potential may be calculated based on the comparison in act 604. In one implementation, a conflict potential may be calculated by determining an extent of overlap between the reference pull request and an active pull request based on the number of common source code files being edited by both pull requests.

In act 608, filters may be applied to the pair of concurrent edits. If multiple pairs of concurrent edits are being evaluated, the filters may be applied to all the pairs. For example, one or more parameters, such as threshold criteria, may be applied to screen or filter out pairs of concurrent edits that have a low conflict potential such that only certain pairs of concurrent edits that have a high conflict potential are designated as candidate conflicts for notification. An example of a threshold can include an extent of overlap threshold, such that concurrent edits with a high degree of overlap are selected for notification, whereas other concurrent edits with a low degree of overlap are not selected for notification, thus avoiding false positives. Another example of a threshold can include rarely concurrently edited files (RCEs). The existence of RCEs in the concurrent edits may be checked and an RCE threshold can be applied such that concurrent edits with at least a certain threshold number of RCEs are selected as candidates for notification. Another example of a threshold can include the total number of common files edited by the concurrent edits. This threshold can be used to filter out concurrent edits that have only a few common files being concurrently edited. These parameters may be set by balancing the desired level of recall versus the desired level of precision.

In act 610, candidate conflicts may be sorted. Where multiple pairs of concurrent edits are being analyzed, the candidate conflicts that pass the filters in act 608 may be ranked using a ranking algorithm. For example, active pull requests that have passed the threshold criteria in act 608 may be ranked in order of conflict potential. The ranking of the candidate conflicts may be used to determine the order of presentation when sending out notifications and/or be used to decide how many of the ranked candidate conflicts to send notifications about. That is, if there are many (e.g., >=10) active pull requests that may potentially conflict with the reference pull request, only the top five ranked active pull requests may be notified to the developer. This may be considered another filter or threshold in act 608

In act 612, notifications about candidate conflicts may be sent. For example, a notification about an active pull request that may potentially conflict with the reference pull request may be sent to the developer who authored the reference pull request. The notification may include information including metadata about the active pull request that could potentially conflict with the reference pull request.

In act 614, feedback about notifications may be received from collaborators. For example, the notifications sent to developers in act 612 may allow the developers to provide feedback about the notifications. Feedback about the candidate conflicts may be received in many ways. The feedback may indicate a positive feedback or a negative feedback about how helpful the notifications were to the developers in detecting and resolving conflicting concurrent edits. The feedback may indicate how the developers reacted to the notification, for example, ignored the warning, resolved an actual conflict, investigated but no actual conflict found, etc.

In act 616, filtering parameters may be tuned. For example, one or more of the parameters used for filtering in act 608 may be adjusted based on the feedback received in act 614. For instance, if the feedback received from the developers indicate that a lot of notifications for false positives are being sent, then one or more of the thresholds discussed in act 608 may be modified to increase precision and decrease recall. In some implementations, acts 614 and 616 of receiving feedback and tuning filtering parameters may be an ongoing or cyclical process.

Figure 7:
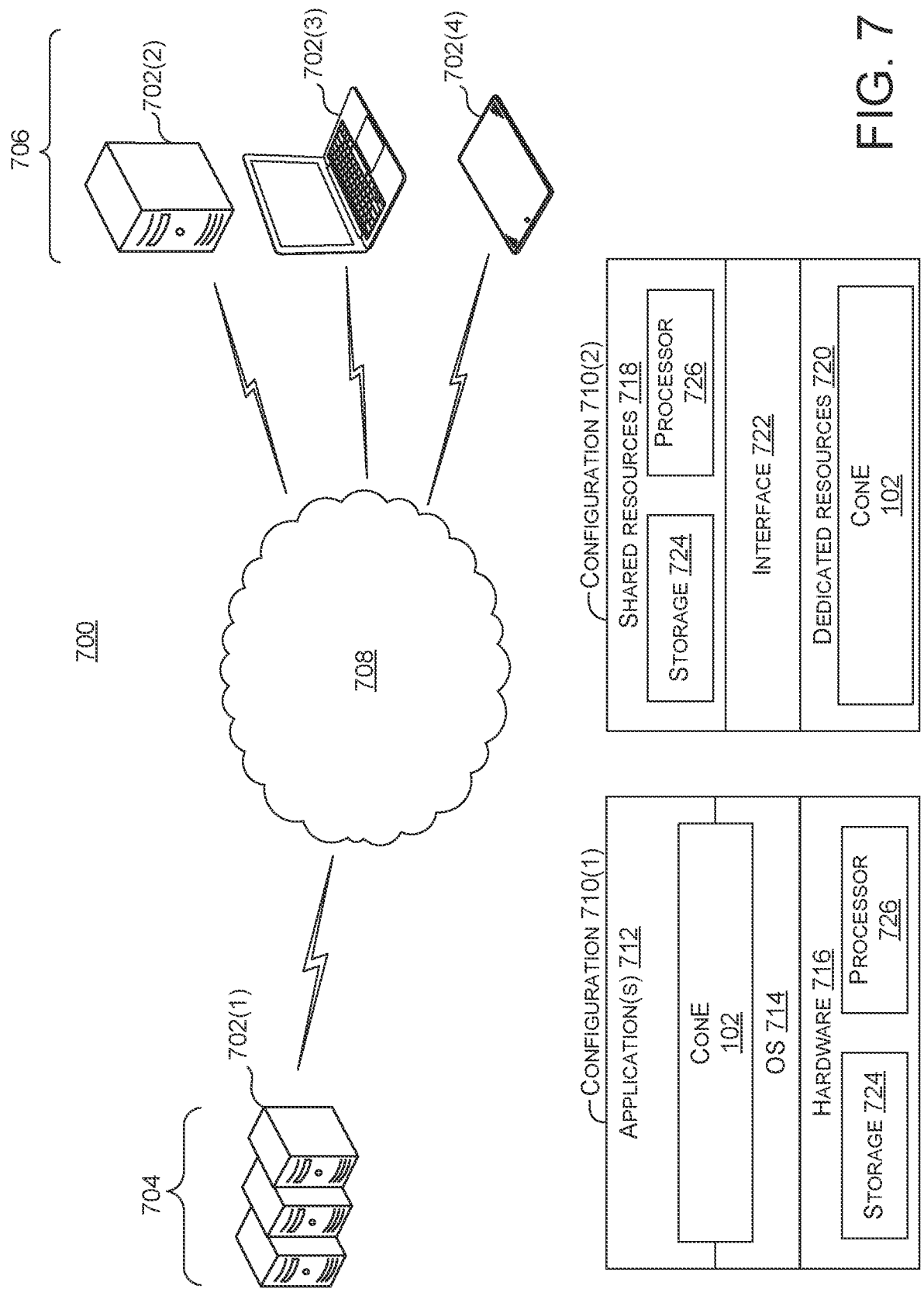
FIG. 7 illustrates an example concurrent edit detection system, consistent with the present concepts.

FIG. 7 illustrates an example concurrent edit detection ("ConE") system 700, consistent with the present concepts. For purposes of explanation, the ConE system 700 may include devices 702. Examples of devices 702 can include personal computers, desktop computers, servers, notebook computers, cellular phones, smartphones, personal digital assistants, tablets or pad type computers, mobile computers, cameras, appliances, virtual reality headsets, video game consoles, controllers, smart devices, IOT devices, vehicles, watches, wearables, set-top boxes, game systems, automobile entertainment or navigation consoles, etc., and/or any of a myriad of ever-evolving or yet to be developed types of electronic devices.

In the example shown in FIG. 7, the devices 702 may include a server device 702(1) (or a collection of servers), a desktop computer 702(2), a laptop 702(3), and a tablet 702(4). For purposes of explanation, device 702(1) can be viewed as being a server-side device 704 (or cloud-based resource), and devices 702(2)-702(4) can be viewed as being client-side devices 706 (or client devices). The number of the devices 702 and the client-versus-server side of the devices 702 described and depicted are intended to be illustrative and non-limiting. The devices 702 can communicate with one another via one or more networks 708 and/or can access the Internet over the one or more networks 708. In some implementations, the server-side devices 704 may be provided by a cloud service, where the server-side devices 704 may exist in multiple networks 708.

The term "device," "computer," or "computing device" as used herein can mean any type of device that has some amount of processing capability and/or storage capability. Processing capability can be provided by one or more hardware processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, optical storage devices (e.g., CDs, DVDs etc.), and/or remote storage (e.g., cloud-based storage), among others. As used herein, the term "computer-readable media" can include transitory propagating signals. In contrast, the term "computer-readable storage media" excludes transitory propagating signals. Computer-readable storage media may include computer-readable storage devices. Examples of computer-readable storage devices may include volatile storage media, such as RAM, and non-volatile storage media, such as hard drives, optical discs, and flash memory, among others.

In some implementations, the server-side devices 704, the client-side devices 706, and/or a combination may perform all or parts of the ConE method 600 as well as other acts described herein. For example, repositories of source code may be stored in the server-side devices 704. The developers 108 may use the client-side devices 706 to view and/or edit the source code. That is, the client-side devices 706 may send the pull requests 110 to the server-side devices 704. Furthermore, the server-side devices 704 may host the ConE 102, described above. Moreover, notifications 400 about potential conflicts may be sent from the server-side devices 704 to the developers on the client-side devices 706. Accordingly, the notifications 400 may be displayed and presented on a display screen of the client-side devices 706.

FIG. 7 shows two example device configurations 710(1) and 710(2) that can be employed by any or all of the devices 702. Individual devices 702 can employ either of the configurations 710(1) or 710(2), or an alternate configuration. One instance of each configuration 710 is illustrated in FIG. 7. The configuration 710(1) may represent an operating system ("OS") centric configuration. The configuration 710(2) may represent a system on a chip ("SoC") configuration. The configuration 710(1) can be organized into one or more applications 712, operating system 714, and hardware 716. The configuration 710(2) may be organized into shared resources 718, dedicated resources 720, and an interface 722 there between. In either configuration 710, the device 702 can include a storage 724 and a processor 726. The device 702 can also include the ConE 102, in whole or in part.

As mentioned above, the configuration 710(2) can be thought of as a SoC type design. In such a case, functionality provided by the device 702 can be integrated on a single SoC or multiple coupled SoCs. One or more processors 726 can be configured to coordinate with shared resources 718, such as storage 724, etc., and/or one or more dedicated resources 720, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" or "module" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component or module are platform-independent, meaning that they may be implemented on a variety of commercial computing platforms having a variety of processing configurations.

The ConE system 700 illustrated in FIG. 7 is merely one example. The ConE system 700 need not include all the example elements described in connection with FIG. 7, and the ConE system 700 may also include additional elements not explicitly described in connection with FIG. 7.

An example implementation of ConE was built for experimental purposes to gather empirical data and improve the design of ConE. This experiment will be described below. This actual implementation illustrates one example way to implement ConE and one example way to collect empirical results, but different implementations are possible and different results may be obtained under different circumstances.

This particular ConE system included three modules: (1) a cloud based worker infrastructure that responded to events happening inside a pull request (e.g., update, commit, etc.) and triggered the ConE algorithm to be run, (2) a data ingestion framework that helped us learn the history of file changes, and (3) a telemetry infrastructure that captured the feedback flowing in from the developers.

ConE was implemented on Azure DevOps (ADO), which is a DevOps platform developed by Microsoft. ConE Service was implemented using C # and .NET 4.7. ConE Service was built on top of Microsoft Azure cloud services: Azure Batch for compute, Azure DevOps service hooks for event notification, Azure worker role and service bus for processing events, Azure SQL for data storage, Azure Active Directory for authentication, and Application Insights for telemetry and alerting. Alternatively, ConE can easily be deployed on other source code control systems without a lot of extra effort or customization due to the generic and modular architecture of ConE.

A two-step deployment plan for ConE was devised, which included (1) enabling ConE in shadow mode, and then (2) enabling notifications and scale out seamlessly. First, ConE was enabled in shadow mode on 60 repositories for two months. In this shadow mode, ConE actively listened to pull requests, ran the ConE algorithm, generated suggestions for notifications of potential conflicts, and saved all the suggestions in a SQL data store for further analysis, but did not send any notifications to developers. During the two-month period, 1,200 suggestions were generated and saved by ConE in shadow mode. The telemetry collected from the suggestions were analyzed to optimize ConE in preparation for a large scale roll out. Once ConE was optimized by balancing precision versus recall, ConE was rolled out and notifications were enabled on 234 repositories in batches of 40 repositories at a time. This step-wise deployment enabled monitoring to ensure satisfactory performance and up time during the controlled scaling. The 234 repositories spanned across different product lines and large-scale cloud development environments in an enterprise with over 30,000 developers actively working on those repositories. ConE made 302 recommendations about potentially conflicting changes since it was enabled.

The results included overwhelmingly positive responses with a positive feedback provided by the developers, a very good user interaction rate of 2.5 clicks per recommendation, and 93.75% of the developers indicating their intent to use ConE on a daily basis.

This empirical study can be broadly classified into three main steps: (1) data collection, (2) data analysis, and (3) correlation analysis. During the data collection step, data about file edits (concurrent and non-concurrent) from the pull request data were collected for 6 months from 8 repositories. These repositories created and completed at least 1,000 pull requests every month, varied in size, was geographically distributed, and used a variety of programming languages (including Java, C #, Python, Type script, C, C++, SQL, and JS).

Several filters were applied. First, stale pull requests, which have been open for more than 30 days, were excluded. Studies have shown that 70% of pull requests are completed with a week of creation, so these stale pull requests are likely to be abandoned later or left open forever. Second, pull request with more than 50 edited files (which is 90th percentile for edited file count in pull requests) were excluded, as they tend to be created by non-human developers doing mass refactoring or styling changes, etc. Third, to focus the study on concurrent edits to source code, a white list was implemented to filter and consider only the following file types: .cs, .c, .cpp, .ts, .py, .java, .js, and .sql. Fourth, any file that was edited more than 20 times in a month (which is 90th percentile) were excluded, because files that contain constants and enumerations (enums) are seen in a lot of active pull request in the same time frame.

Applying these filters resulted in 68,249 pull requests with 97,612 unique files that were edited at least once in 6 months. The 97,612 files were categorized into two sets: (1) 37,112 concurrently edited files which have been edited by two or more pull requests while they were both active (i.e., not completed or abandoned), and (2) 60,490 non-concurrently edited files which were never edited by two pull requests while they both were in active state.

During the data analysis step, every edited file (both concurrently and non-concurrently) was checked to determine whether the nature of the edit had any effect on that file to be seen in bug fixes after the edit has been merged. The percentage of edited files that were seen in bug fixes within a day, a week, 2 weeks and a month varied with nature of the edit (concurrent vs non-concurrent). Across all the 8 repositories, the percentage of files that were edited concurrently were seen more frequently in bug fixes than the non-concurrently edited ones. Close to 50% of the bug fixes were actually created by one of the original authors of the concurrent pull requests.

During the correlation analysis, Spearman correlation analysis was performed to show how the total number of edits versus concurrent edits versus non-concurrent edits correlate with the number of bugs in which those files are seen. A significant difference between correlation coefficients for total edits versus bug fixes and concurrent edits versus bug fixes were observed. Accordingly, concurrently edited files have a higher chance of introducing bugs and being later seen in bug fixes. Also, the correlation between concurrent edits to bug fixes was significantly higher than that of non-concurrent edits to bug fixes.

ConE was enabled on 234 repositories and had made 302 recommendations. Two metrics were used to quantitatively analyze the results: (1) comment resolution percentage and (2) extent of interaction (EOI) with notifications. For the comment resolution percentage, the ADO provided an option for developers to provide feedback on every comment that is placed in their pull requests. Developers could select the "Resolved" option if they liked or agreed with the notification or the "Won't fix" option if they did not think it was useful. Or, the developer could also choose not to provide any feedback by just leaving the comment as is in the "Active" state. Out of 302 comments, 197 (65.23%) were positively resolved, only 38 (12.58%) were marked as "Won't fix," and 67 (22.1%) did not provide any feedback.

For the extent of interaction (EOI), as explained above, a typical ConE notification/comment can have multiple elements that a developer can interact with, for example, hyperlinks for the pull request identification, filenames with conflicting changes, the author name, etc. When a developer interacted with any of the elements in the comment, that action was immediately logged as telemetry in Azure AppInsights. In total, 755 interactions were logged on the 302 comments. That is, on average, 2.5 clicks per comment. This EOI metric is a conservative number, because developers can take actions from the comments without interacting with the hyperlinks in the comments.

A qualitative analysis of the results was also conducted by reaching out to the developers who authored 100 randomly selected pull requests on which ConE comments were placed. They were asked survey questions. In total, 48 out of 100 responded, 25 (52.08%) responded that they would love to use ConE, 20 (41.67%) responded that they will use ConE, and 3 (6.25%) responded that they don't want to use ConE. Therefore, 93.75% of the respondents indicated interest and willingness to use ConE.

Various examples have been described above. Although the subject matter has been described in language specific to example structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

Various examples are described above. Additional examples are described below. One example includes a system comprising a processor and storage storing instructions which, when executed by the processor, cause the processor to: listen for a plurality of pull requests including a reference pull request from a user, determine a plurality of extents of overlap for a plurality of active pull requests by comparing the reference pull request with the plurality of active pull requests, filter the plurality of active pull requests based on the plurality of extents of overlap, determine a subset of the plurality of active pull requests for notification, and notify the user about the subset of the plurality of active pull requests as potentially conflicting with the reference pull request.

Another example can include any of the above and/or below examples where a particular extent of overlap is determined based on a number of common files edited by the reference pull request and by a particular active pull request.

Another example can include any of the above and/or below examples where the instructions further cause the processor to determine a plurality of counts of rarely concurrently edited files for the plurality of active pull requests by comparing the reference pull request with the plurality of active pull requests and filter the plurality of active pull requests based on the plurality of counts of rarely concurrently edited files.

Another example can include any of the above and/or below examples where the instructions further cause the processor to sort the plurality of active pull requests using a ranking algorithm.

Another example can include any of the above and/or below examples where the instructions further cause the processor to generate a notification including one or more of: an identification of a particular active pull request, an identification of an author of the particular active pull request, or an identification of a file edited by the reference pull request and by the particular active pull request.

Another example can include any of the above and/or below examples where the notification includes at least one of a first link to contact the author or a second link to view the file.

Another example includes a computer-readable storage medium storing instructions which, when executed by a processor, cause the processor to: detect a first set of files edited by a first user and a second set of files edited by a second user, determine an extent of overlap between the first set of files and the second set of files, determine a potential conflict based on the extent of overlap, and send a notification to at least one of the first user or the second user about the potential conflict.

Another example can include any of the above and/or below examples where the extent of overlap is based on a count of one or more common files in the first set of files and the second set of files.

Another example can include any of the above and/or below examples where the instructions further cause the processor to determine a count of rarely concurrently edited files in common between the first set of files and the second set of files and determine the potential conflict based on the count of rarely concurrently edited files.

Another example can include any of the above and/or below examples where the instructions further cause the processor to receive a feedback from the first user or the second user that the potential conflict is resolved.

Another example can include any of the above and/or below examples where the instructions further cause the processor to receive a feedback from the first user or the second user that the potential conflict is a false positive.

Another example includes a computer-implemented method comprising: detecting a first edit to a content by a first user, detecting a second edit to the content by a second user, comparing the first edit with the second edit, determining a conflict potential based on the comparing of the first edit with the second edit, determining whether to notify the first user about the second edit based on the conflict potential, and notifying the first user about the second edit.

Another example can include any of the above and/or below examples where the content includes source code.

Another example can include any of the above and/or below examples where detecting the first edit comprises listening for a reference pull request from the first user.

Another example can include any of the above and/or below examples where the conflict potential is determined based on an extent of overlap between the first edit and the second edit.

Another example can include any of the above and/or below examples where the extent of overlap is based on a number of common files edited by both the first edit and the second edit.

Another example can include any of the above and/or below examples where the conflict potential is based on a count of rarely concurrently edited files in common between the first edit and the second edit.

Another example can include any of the above and/or below examples where determining whether to notify comprises applying a set of filters to a pair of the first edit and the second edit, the set of filters including a set of parameters including one or more of: an extent of overlap threshold, a rarely concurrently edited files threshold, or a total edited files threshold.

Another example can include any of the above and/or below examples where the computer-implemented method further comprises receiving a feedback from the first user about the second edit and tuning the set of parameters based on the feedback.

Another example can include any of the above and/or below examples where the notifying comprises generating a graphical user interface including an identification of the second edit and an identification of the second user.

The invention claimed is:

1. A system, comprising:
  a processor; and
  storage storing instructions which, when executed by the processor, cause the processor to:
    listen for a plurality of pull requests including a reference pull request from a user;
    calculate a first heuristics construct based on a plurality of extents of overlap in edits for a plurality of active pull requests by comparing the reference pull request with the plurality of active pull requests;
    filter the plurality of active pull requests based on the first heuristics construct;
    determine a set of potential conflicts including a subset of the plurality of active pull requests for notification; and
    notify the user about the set of potential conflicts including the subset of the plurality of active pull requests as potentially conflicting with the reference pull request.

2. The system of claim 1, wherein a particular extent of overlap is determined based on a number of common files edited by the reference pull request and by a particular active pull request.

3. The system of claim 1, wherein the instructions further cause the processor to:
  calculate a second heuristics construct based on a plurality of counts of rarely concurrently edited files for the plurality of active pull requests by comparing the reference pull request with the plurality of active pull requests; and
  filter the plurality of active pull requests based on the second heuristics construct by comparing the plurality of counts of rarely concurrently edited files with an adjustable rarely concurrently edited files threshold.

4. The system of claim 1, wherein the instructions further cause the processor to:
  compare the plurality of extents of overlap with an adjustable extent of overlap threshold.

5. The system of claim 1, wherein the instructions further cause the processor to generate a notification including one or more of:
  an identification of a particular active pull request;
  an identification of an author of the particular active pull request; or
  an identification of a file edited by the reference pull request and by the particular active pull request.

6. The system of claim 5, wherein the notification includes at least one of a first link to contact the author or a second link to view the file.

7. A computer-readable storage medium storing instructions which, when executed by a processor, cause the processor to:
  detect a first set of files edited by a first user and a second set of files edited by a second user;
  calculate a first heuristics construct based on an extent of overlap in edits between the first set of files and the second set of files;
  determine a potential conflict based on the first heuristics construct by comparing the extent of overlap with an adjustable extent of overlap threshold; and
  send a notification to at least one of the first user or the second user about the potential conflict.

8. The computer-readable storage medium of claim 7, wherein the extent of overlap is based on a count of one or more common files in the first set of files and the second set of files.

9. The computer-readable storage medium of claim 7, wherein the instructions further cause the processor to:
  calculate a second heuristics construct based on a count of rarely concurrently edited files in common between the first set of files and the second set of files; and
  determine the potential conflict based on the second heuristics construct by comparing the count of rarely concurrently edited files with an adjustable rarely concurrently edited files threshold.

10. The computer-readable storage medium of claim 7, wherein the instructions further cause the processor to:
  receive a feedback from the first user or the second user that the potential conflict is resolved.

11. The computer-readable storage medium of claim 7, wherein the instructions further cause the processor to:
  receive a feedback from the first user or the second user that the potential conflict is a false positive.

12. A computer-implemented method, comprising:
  detecting a first edit to a content by a first user;
  detecting a second edit to the content by a second user;
  calculating a first heuristics construct based on an extent of overlap in edits between the first edit and the second edit;
  determining a conflict potential based on the first heuristics construct by comparing the extent of overlap with an adjustable extent of overlap threshold;

determining whether to notify the first user about the second edit based on the conflict potential; and notifying the first user about the second edit.

13. The computer-implemented method of claim 12, wherein the content includes source code.

14. The computer-implemented method of claim 12, wherein detecting the first edit comprises:

listening for a reference pull request from the first user.

15. The computer-implemented method of claim 12, wherein the first edit and the second edit are active at a same time frame.

16. The computer-implemented method of claim 12, wherein the extent of overlap is based on a number of common files edited by both the first edit and the second edit.

17. The computer-implemented method of claim 12, further comprising:

calculating a second heuristics construct based on a count of rarely concurrently edited files in common between the first edit and the second edit.

18. The computer-implemented method of claim 12, wherein determining whether to notify comprises:

applying a set of filters to a pair of the first edit and the second edit, the set of filters including a set of parameters including one or more of:

the adjustable extent of overlap threshold, an adjustable rarely concurrently edited files threshold, or an adjustable total edited files threshold.

19. The computer-implemented method of claim 18, further comprising:

receiving a feedback from the first user about the second edit; and adjusting the set of parameters based on the feedback.

20. The computer-implemented method of claim 12, wherein the notifying comprises:

generating a graphical user interface including an identification of the second edit and an identification of the second user.

* * * * *